(12) United States Patent
Kende et al.

(10) Patent No.: US 7,801,783 B2
(45) Date of Patent: Sep. 21, 2010

(54) SYSTEM AND METHOD FOR AUTOMATIC ANALYSIS OF RATE INFORMATION

(76) Inventors: Michael Kende, 3333 Tennyson St., NW., Washington, DC (US) 20015;
Robert Christian MacDonald, 97 Osborn Rd., Rye, NY (US) 10580;
James G. Gatto, 1101 Mountain Hope Ct., Great Falls, VA (US) 22066

( * ) Notice: Subject to any disclaimer, the term of this patent is extended or adjusted under 35 U.S.C. 154(b) by 2805 days.

(21) Appl. No.: 09/997,273

(22) Filed: Nov. 30, 2001

(65) Prior Publication Data

US 2002/0120540 A1    Aug. 29, 2002

Related U.S. Application Data

(60) Provisional application No. 60/250,834, filed on Dec. 1, 2000.

(51) Int. Cl.
*G06Q 40/00* (2006.01)

(52) U.S. Cl. .............. 705/35; 705/38; 705/39; 705/40; 705/14.67; 705/14.7; 705/14.71

(58) Field of Classification Search ............. 705/35–45, 705/14.67, 14.7, 14.71
See application file for complete search history.

(56) References Cited

U.S. PATENT DOCUMENTS 6,885,997 B1 *   4/2005   Roberts ....................... 705/26

\* cited by examiner

*Primary Examiner*—Kirsten S Apple

(57) ABSTRACT

A multi-factor rate analysis system and method for analyzing service plan rates, service providers, and savings other information is provided. Rate information may be based on one or more of historical and other user specific usage information and preferences, current rate information for one or more services as well as other information. This information may be used to identify one or more rate plans that are advantageous to a user, enable the user to select from the identified plans, facilitate the ability of the user to switch from one rate plan to another and provide other benefits and advantages.

24 Claims, 3 Drawing Sheets

SYSTEM AND METHOD FOR AUTOMATIC ANALYSIS OF RATE INFORMATION

RELATED APPLICATIONS

This application claims priority from U.S. Provisional Patent Application Ser. No. 60/250,834, filed Dec. 1, 2000, entitled "System and method for automatic analysis of rate information."

FIELD OF THE INVENTION

The invention relates generally to the field of automatic analysis of rate information, more particularly to a system and method for determining preferred billing rate plans for individual users based on one or more of a user's personal preferences, prior usage patterns, service provider rate plans, incentives, other available savings, user independent external factors, predictors of demand or pricing and other factors.

BACKGROUND OF INVENTION

Users of various services do not always use the service provider or rate plan that is best suited for that individual. The reasons for this vary, but include the lack of time, interest or ability to keep up with the overwhelming amount of information about rate plans and changes to rate plans and the lack of time, interest or ability to compare prior usage to existing plans to determine an advantageous plan, and continuously updating the analysis as plans and needs change. For these and other reasons, many users do not select the best plan for them based on their personal usage patterns or preferences. As a result, many users overpay for these and other services.

Oftentimes, customers may not be aware of existing savings plans and/or programs. Thus, customers may be paying higher prices due to the lack of information and awareness of savings programs. Also, customers may not be aware that a slight change in usage may save them money with each bill.

The savings information currently available to users may be too general. Thus, an individual with specific needs or meeting certain criteria may not be able to retrieve appropriate information regarding rate plans, service providers and other savings information.

Another problem relates to service providers' constant desire to attract more customers and the costs associated therewith. In many industries, it is expensive and difficult for service providers to attract new customers. Additionally, it is difficult for service providers to accurately predict in advance the effect of changing the terms of existing rate plans or introducing new rate plans.

These and other drawbacks exist.

SUMMARY OF THE INVENTION

An object of the invention is to overcome these and other drawbacks.

Another object of the invention is to provide a multi-factor rate analysis system and method for analyzing, on a per user basis or other basis, service plan rates, service providers, and other information. Rate information may be based on one or more of historical and other user specific usage information and preferences, current rate information for one or more services as well as other information. This information may be used to identify one or more rate plans that are advantageous to a user, enable the user to select from the identified plans, facilitate the ability of the user to switch from one rate plan to another and provide other benefits and advantages.

According to an embodiment of the invention, a system may include various modules and databases for analyzing rate information to generate one or more beneficial rate plans, other savings suggestions and/or other information to one or more users. For example, a central rate analysis tool of the present invention may include one or more of a prior usage module, a billing rate module, a profile module, an external data module, a savings module, a savings calculation module, a deliver module, a text-to-speech module, an outbound calling module, a schedule module, a proactive savings module, a switching module, a demand aggregation module, an analysis engine module, an affinity module and other modules and databases.

According to another embodiment, various data and other information may serve as inputs to various modules. For example, electronic prior usage data may be as an input for a prior usage module. A savings database may serve as an input for a savings module. A billing rate database may serve as an input for a billing rate module. External data may serve as an input to an external data module. Affinity data from various sources may serve as an input to affinity module. Other information and/or sources may also serve as inputs to these and other modules and databases.

Services may include recurring or other services such as long distance telephone, wireless telephone, electric power, natural gas, water, sewer, internet access, cable television, satellite television, and other services.

A prior usage module may be used for receiving and storing usage information associated with individual users and other entities. A profile module may enable users to create user profiles, preferences, and other personal information. A billing rate module may contain rate plan information from one or more service providers, and other entities for one or more services. An external data module may contain user independent data and other data that may be relevant to a rate or usage analysis. An analysis engine module of the present invention may analyze one or more of individual usage patterns; user profile; user preference information; rate information, external data and other information, to determine one or more preferred rate plans and other savings options for a particular user.

The system of the present invention may further include a savings module, a savings calculation module and a proactive savings module. A savings module may provide savings information to a user based on user related information, such as information obtained through the profile module and other personalized information. For example, the savings information may be in the form of static text where the savings information is relevant and applicable to the user. A savings calculation module may be used to provide the user with an amount of savings based on the user making the recommended one or more changes. Savings amount may be in the form of percentage and/or dollar amount, for example. Graphical illustrations of savings history may also be provided. A proactive savings module may provide active savings suggestions to a user that entails some participation by the user. Generally, proactive savings module may provide savings suggestions that include behavior modification, which may include changing usage habits, installation of certain equipment and other actions.

The system of the present invention may further include a delivery module that enables information resulting from an analysis to be forwarded to a user or other identified destination, such as a service provider or other location for consideration and/or use. A text-to-speech module may be used to forward or relay information to a user by voice as specified by the user. Also, an outbound call module may be used to delivery information to the user via phone (cell phone or other mechanism).

The system may further include a switching module that may enable automatic or facilitated switching from one rate plan to another (whether it is from one provider to another or within the same provider). Switching from one rate plan (and/or service provider) to another may be partially or fully automatic at the user's preference.

The system may further include a demand aggregation module that may draw upon various factors such as one or more of stated user preferences (including thresholds of savings beyond which a user would switch providers); actual or projected usage patterns; and other factors to generate price proposals at various levels of demand and deliver such proposals to providers, which proposals, if accepted, would be made available to users.

A schedule module may be used to enable users to determine at what frequency to analyze rate and other information. For example, analysis may be performed on a weekly, bimonthly, monthly, etc. basis, as determined by the user or based on one or more predetermined triggers.

An affinity module may be utilized by the present invention to provide information to a user regarding available affinity programs and offers that may be applicable to the user for certain rate plans. This may be a factor taken into account in doing an analysis.

These and other objects, features and advantages of the invention will be apparent through the detailed description of the embodiments and the drawings attached hereto. It is also to be understood that both the foregoing general description and the following detailed description are explanatory and not restrictive of the scope of the invention.

DETAILED DESCRIPTION OF THE INVENTION

The present invention provides a multi-factor rate analysis system and method for analyzing, on a per user basis or other basis, service plan rate information, service providers, and other information. Rate information may be based on one or more of historical and other user specific usage information and preferences, current rate information for one or more services as well as other information. This information may be used to identify one or more rate plans that are advantageous to a user, enable the user to select from one or more identified plans, and facilitate the ability of the user to switch from one rate plan to another. Other benefits and advantages are also available.

An embodiment of the invention comprises a central rate analysis tool (e.g. a stand alone web site a plug-in to another web site or non-web site implementation) that may include an analysis engine for automatically determining one or more preferred service providers and/or rate plans for various recurring or other services for a user based on one or more of a user's prior usage patterns, personal preferences and other information as desired. Other personalized savings related information may also be presented which may include behavior change recommendation, installation recommendation, eligible savings plans and programs and other information. The analysis engine may perform these and other functions across one or more vertical markets including telecommunications (wired and wireless), energy (electric power, natural gas and water), multimedia (Internet access, cable and satellite television, WebTv) and other services and products.

Figure 1:
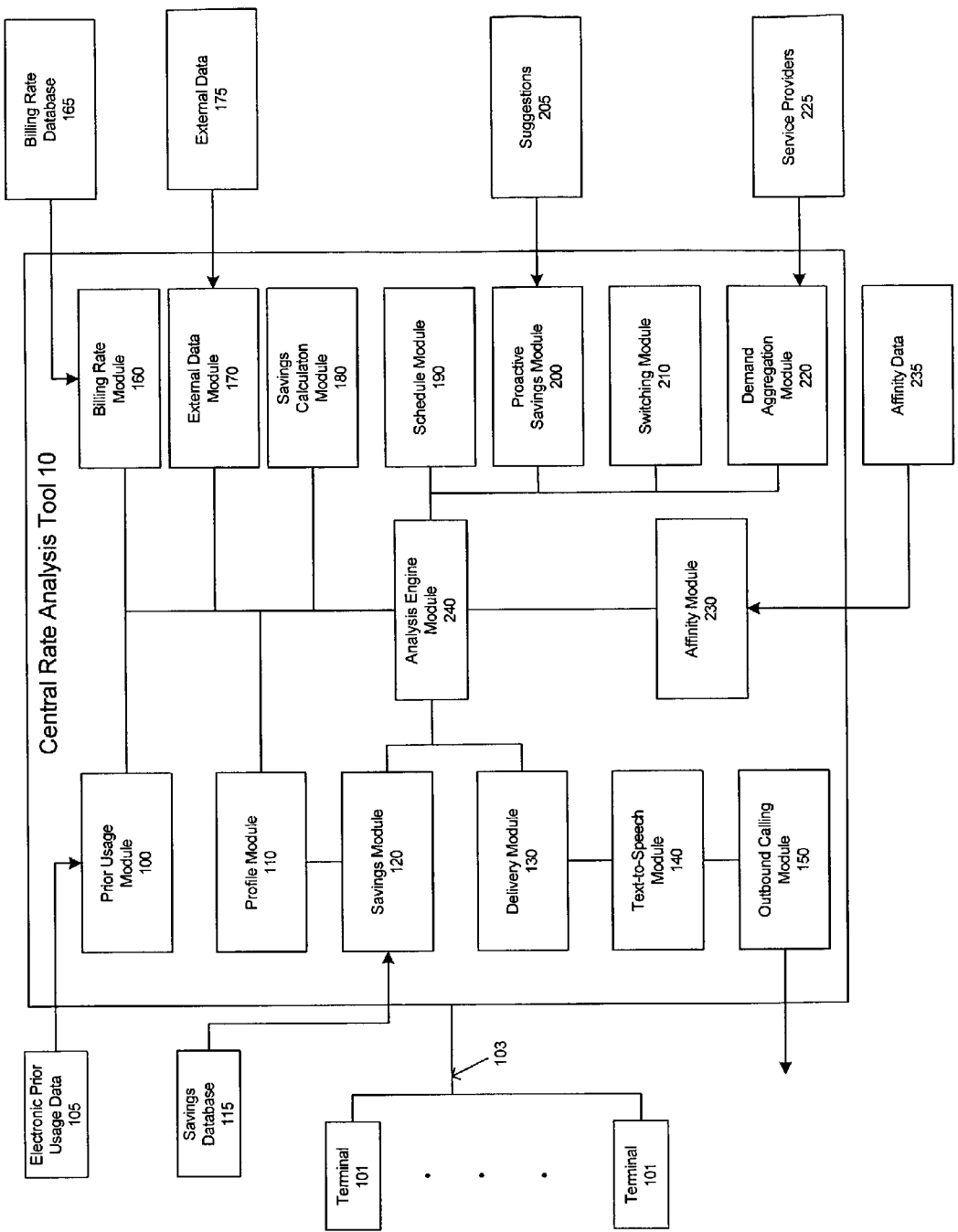
FIG. 1 illustrates an example of a block diagram representation of a system for automatic analysis of rate information in accordance with the present invention.

FIG. 1 illustrates a block diagram of a system for analyzing rate information, according to an embodiment of the present invention. The system may comprise a web site or other computer implemented tool 10. For simplicity and to avoid repetition, various embodiments of the invention may be described with reference to a web site as the central tool. The invention is not so limited.

According to an embodiment of the present invention, central rate analysis tool 10 may be accessed by one or more users from one or more terminals 101 over a communications network 103. In addition, tool 10 may be connected to other web sites or systems. Terminals 101 may include personal computers, kiosks, wireless devices, internet appliances, Web TV and other types of terminal devices. The communications network 103 may be or include a wired or wireless network including the Internet, World Wide Web, analog or digital cellular network, satellite, other communications networks and any combination thereof.

According to an embodiment of the present invention, central rate analysis tool 10 may include various modules to support the various features and functions described herein. The features or functions of one or more modules may be combined where multiple modules may be used to handle a single described feature or function, for example. Also, additional features and functions may be added without departing from the intended scope of the invention.

According to an embodiment of the present invention, central rate analysis tool 10 may include one or more of the following modules: a prior usage module 100 for receiving and storing prior usage information associated with particular individual user and/or other entities; a billing rate module 160 that collects and maintains rate plan and other information for one or more service providers; a profile module 110 that enables users to create user profiles and preferences; an external data module 170 that comprises user independent data and/or external factors that may be relevant to a rate analysis; a savings module 120 for providing savings related information; a delivery module 130 for enabling a user to specify one or more methods of delivery, a text-to-speech module 140, an outbound calling module 150, a savings calculation module 180 for displaying an amount or percentage saved, a schedule module 190 for scheduling rate analysis, a proactive savings module 200 for determining and delivering savings related information involving user participation, a switching module 210 for facilitating switching to a more beneficial rate plan and/or service provider, a demand aggregation module 220; an affinity module 230, an analysis engine module 240 for performing detailed analysis of rate plans and/or service providers and other information; and other modules and/or databases.

Various inputs may also be available to modules and/or databases of central rate analysis tool 10 of the present invention. Inputs may include information from databases, third parties and other sources. Such inputs may include electronic prior usage data 105, savings database 115, billing rate database 165, external data 175, suggestions 205, service providers 225, affinity data 235 and other information and/or sources.

Modules of the present invention may include software, code or other technology to enable information to be gathered, stored and/or processed. Other operations may also be performed. The information may be maintained in a database associated with each module or group of modules. In another example, modules may share information stored in various databases. Also, information may be stored and maintained in a single master database. Other variations for gathering, storing, and/or processing information may be utilized, in accordance with the present invention.

Prior usage module 100 may receive prior usage information associated with individual users. The prior usage information may be obtained and entered into prior usage module 100 in a variety of manners. Prior usage information may be manually entered by a user, prompted by the system, retrieved automatically through sources and/or databases and accessed through other retrieval methods.

According to an embodiment of the present invention, a plurality of forms or templates for different services may be presented to a user to query the user for information regarding the user's usage of various services. Information may include frequency of use, amount of use, amount usually paid for the service, amount of savings (threshold) that would cause a user to switch, and other usage information. In response, the user may manually enter the requested information. Various levels of sophistication may be used. The user may manually enter usage information or select from a list of possible selections that may be used to identify usage patterns.

For example, the user may be presented with a form on a display screen of a terminal that enables the user to select a type of service from the services available through the system. The system may then present the user with another form that enables the user to enter relevant information for that service (e.g., estimate past, current, or future patterns of usage, current billing plan(s) and other criteria for a particular service). These screens may be implemented to enable users to indicate the relevant categories of service and estimate the usage of each relevant aspect. The information obtained from a user may be tied to the various factors that determine beneficial rate plan based on the categories of information in billing rate module 160.

For example, a user may be queried concerning the number of long distance calls made that are intra-state, inter-state, or international. Further, the user may be prompted to enter the average duration of these long distance telephone calls. Further, for long distance information, a user may be asked to estimate the number of minutes of long distance service used Monday through Friday, on Saturday, and on Sunday. Each of these categories may also be subdivided into peak and non-peak usage. More detailed information may be provided to better assess an advantageous rate plan available to that user.

In another example, a user may be asked to indicate when (peak, non-peak, weekday, weekend), where (home area or roaming) and how (local, long distance) the user plans to use the wireless phone or other wireless service. The user may also be prompted to estimate the number of minutes used in each relevant category. The user may also be asked how many of these minutes utilize a digital service network versus an analog service network. For internet access information, a user may be asked the number of peak and non-peak minutes used within a certain time period. The user may also be queried as to the various access speeds utilized within a certain time period and the corresponding minutes used for each access speed. Other usage information may also be gathered.

According to another embodiment of the present invention, a system and method may provide at least partial automation of collecting of a user's prior service usage information for use in a rate analysis system, over one or more periods. For example, automation may be accomplished by extracting electronic usage information from an electronic bill payment and presentment (EBPP) system, electronic statement presentment (ESP) system, or by using other methods of automatically obtaining a user's prior usage information. Thus, the need for a user to manually enter the user's prior usage information to benefit from a rate plan analysis system may be avoided. Further, the user may not be prompted to provide rough estimates of usage information. By extracting information from an electronic bill payment system, for example, the information obtained is accurate and easily obtained. For example, rather than estimating a rough number of minutes used by a user, the system may ascertain the exact number of minutes (including seconds) of cell phone usage, including when the calls where made, from where, and to what area.

Other benefits may result from the system operator partnering with or incorporating into its site an electronic bill payment and presentment (EBPP) or ESP system. Some of the benefits of partnering is that the system operator may obtain access to: 1) an established base of users that already rely on the Internet to deal with their recurring service providers; and 2) detailed usage and billing information in electronic format. This latter advantage may facilitate the ability to automatically monitor customer usage and enable the engine to more accurately determine better deals for users without human intervention on the part of the user or system operator personnel.

In a special GUI, the single screen input form may display a beneficial usage plan or plans corresponding to a user's input of usage estimates. This beneficial usage plan may be calculated by analysis engine module 240, based on information entered by the user into the prior usage module 100 through a usage input module, the information in billing rate module 160, and in another embodiment profile module 110, and external data module 170. Other sources of information may also be accessed. A single screen input form may further enable the user to change the estimated usage for one particular category while holding constant the estimated usage in other relevant usage categories. For instance, the user may change the estimated weekend long distance calling minutes while keeping constant the amount of weekday long distance calling minutes and the number of international calling minutes to see whether this changes the preferred rate plan.

In another embodiment, the single screen input form may indicate that the choice of service plan may be particularly sensitive to changes in one or more usage categories. For instance, for wireless calling plans the form may indicate that a slight increase in roaming minutes over the initially estimated number would change the preferred calling plan. The user may decide based on this indication that, given the possibility that the initial estimate of roaming may have been too low, that the preferred calling plan is the one corresponding to the higher number of roaming minutes. Proactive savings suggestions may also be made.

According to another embodiment, the prior usage module 100 may receive billing information associated with individual users in an automated or semi-automated fashion. For example, many service providers either directly or indirectly use Electronic Bill Payment and Presentment (EBPP) systems Electronic Statement Presentment (ESP) systems for the electronic or automated delivery of invoices to customers. The prior usage module 100 may receive electronically prior usage information from a service provider (or from a third party invoicing system utilized by a service provider) via EBPP, ESP or other electronic system, as illustrated by electronic prior usage data 105. Prior usage module 100 may process the electronic prior usage information 105 received for a particular user and identify usage information that may be automatically passed to prior usage module 100 to automatically offer prior usage information for a user.

In another embodiment of the invention, various other options for entering usage patterns may be utilized. For example, a user tracking monthly expenses with spreadsheet, budgeting or financial software programs, or other similar tools, may provide such information in an electronic format. For example, a user tracking monthly expenses with a program such as Quicken or Microsoft Money may provide prior usage module 100 with usage patterns in an electronic format via email or other method of conveying information in an electronic format. This embodiment has an advantage of saving the user from manually re-entering usage information which has already been stored in a software program. In another example of the various other options for entering usage patterns, a user may receive a printed invoice from a service provider. The invoice may display the user's service usage, billing and other information for a certain time period. The service usage and billing information on the printed invoice may be entered into prior usage module 100 using an optical scanner and optical character recognition software. Prior usage module 100 may then process the service usage and billing information to establish usage patterns.

An analysis engine of the present invention may be used to identify usage patterns (seasonal, weekly, peak, non-peak, etc.) based on one or more of user's historical data, current or future usage information, user independent external factors (such as weather, major events, and other factors) to find better rate plans for users at different times.

According to another aspect of the invention, user profile information may be used to identify billing plan and service factors relevant and important to a user and to present personalized savings information to a user. For example, savings information may include rebates, credits, discounts, programs or other savings for which the user is eligible to receive. The user profile may provide significant insights into the user's demographics, preferences and other relevant information that may be used in a legitimate way to the benefit of the system operator. Many individuals may be reticent about giving out personal information and completing on-line profiles or surveys. However, because a significant value may be received, more users may be convinced to do this according to the system of the invention.

Profile module 110 may receive information that identifies a user and the user's preferences. Profile information may be manually entered by a user or retrieved from an identified source. For example, profile information may include personal information such as demographics (e.g., address, employment, age, etc.), home ownership (e.g., rent or own), services used, affinity programs, available equipment, whether payments are made on-line, price preferences (e.g., fixed, variable, etc.) thresholds of savings that would cause a user to switch, relative importance of factors in determining a better plan, whether automated switching is desired and authorized and other information. Profile information entered, retrieved or otherwise obtained may be used to generate beneficial rate plans and other personalized savings options and/or suggestions.

For example, certain savings options may be available to homeowners, but not renters. A homeowner may have the option of making energy efficient upgrades, whereas a renter may not. This may include installing a certain type of window to reduce heat loss thereby lowering heating bills. By simply knowing this one piece of information, the present invention may inform the user that certain energy discounts or rebates are available and provide the user the opportunity to obtain additional information. In addition, a renter may be spared the annoyance of receiving irrelevant information related to potential savings flowing from home ownership.

In addition, currently owned equipment information may be used to determine whether certain savings options are available to the user. For example, certain upgrades may not be feasible without the necessary equipment, such as a DSL line and other equipment. Also, a user may specify equipment that the user plans on purchasing and installing in the near future, which may make the user eligible for certain savings suggestions.

According to another example, profile information may include the services that the user utilizes or is interested in utilizing, current service provider information, preferences regarding how the user is to be notified about rate plan changes and alternative rate plans, switching options, and/or certain usage pattern information and/or other information. Additionally, personal user information which may effect rate plan pricing or selection may be received by profile module 110.

Further, user-defined criteria may be applied to savings information to ensure that the user receives personalized, accurate and applicable savings information. For example, a user may include and exclude various types of services as well as specific service providers. Other criteria based on price, selection, convenience, location and other factors may be identified by the user.

For example, personal user information which may effect rate plan pricing may include affinity or membership programs (e.g., airline frequent flier programs, automobile clubs, trade or professional associations, etc.), other user utilized services which may be bundled to result in lower overall rate plans, geographic location, user-owned equipment (e.g., cell phone model, type of personal computer, type of modem, etc.) and other information.

The profile module 110 may also receive user information potentially affecting rate plan selection. For example, in an embodiment of the invention, profile module 110 may receive user information regarding the frequency of rate plan analysis and reporting, service provider preferences, threshold savings required before a rate plan switch would be considered, user preferred time period that must elapse before a rate plan switch would be considered, preferred service provider reliability, and other user values which may affect a decision regarding a service provider.

Profile module 110 may also include user predictions and estimations regarding future service usage. For example, a user who may be experiencing an extended absence from their primary dwelling may provide profile module 110 with such information and the user may preference minimized service plans for the period of absence. This may include vacations, holidays, business trips, use of a second house and other extended periods of absence. Therefore, during a user's absence, heating, cooling, gas, phone and other expenses may be lower. If the user knows when the user will return and wants to switch back to the service plans used prior to the absence, the system may automatically do that at a scheduled time.

Profile module 110 may also include personalized user information which may qualify the user for government subsidy programs, service provider incentive and/or other discount programs. For example, profile module 110 may store information that may be used to determine whether a user qualifies for government subsidies by querying the user regarding home ownership, annual income and/or other factors.

In another example, profile module 110 may store information necessary to determine whether the user may qualify for service provider incentive and/or discount programs. For instance, profile module 110 may query a user concerning willingness to upgrade to a more fuel-efficient furnace.

In another example, profile module 110 may query a user concerning willingness to switch from utilization of heating oil to utilization of natural gas. Such information may then be used to later analyze whether a user may qualify for incentive or discount programs from a service provider, for example.

Profile module 110 may also query the user regarding willingness to purchase services available in the future. For instance, existing services not yet available in the user's neighborhood, such as may be the case today with cable modem service or DSL. Another example is future wireless Internet services that have not yet been introduced.

Billing rate module 160 may comprise rate plan information for one or more service providers. The rate plan information may be stored in any convenient format, such as a table or a database. The rate plan information stored in billing rate database 165 may include rate plan criteria and categories useful in assessing preferred and appropriate rate plans for an individual user as well as other information. Other sources may also be accessed.

In another embodiment, billing rate database 165 may comprise the tariff data regarding the rate plans of one or more service providers. Billing rate database 165 may also contain information on discounted promotional rate plans or introductory rate plans offered by service providers. Other criteria, such as billing increments, volume usage discounts, service provider bundling options, discounts provided to members of certain organizations partnered with service providers, and the like, may also be stored in billing rate database 165.

The information accessed by billing rate module 160 may be obtained from a variety of sources, as illustrated by billing rate database 165. These sources may include, for example, published service provider tariffs and rates. The information may be provided to billing rate module 160 in any manner of formats, including manual entry or submission of the information in an electronic format. XML, screen scraping, web bots and other automated tools may be used to automate the identification of this or other information usage by the system.

In an embodiment of the present invention, the information in billing rate database 165 may be updated whenever a change, (or other modification) is made in any of the published rates of a service provider. In another embodiment, information may be updated at regular intervals of time and/or at the occurrence of an identified triggering event. In another embodiment, information in billing rate database 165 may be updated in response to an update request by a user, an operator or other entity.

In another embodiment, the information in billing rate database 165 may be updated to indicate when an existing service becomes available in new areas, or when new services are available nationwide. This information may be conveyed to users who have indicated in profile module 110 that they are interested in a particular service when it becomes available.

The external data module 170 may comprise user independent and other data relevant for rate analysis or service provider selection. External data 175 may comprise various factors or points of information which may be relevant to a user or users independent of service usage of the user or users. Non-limiting examples of such data may include seasonal or cyclical patterns in service provider rates, temperature or meteorological forecasts, quality or reliability of a service provider, service provider values and charitable contributions, service provider ownership and investments, historic communications or multimedia usage reactions tied to news events, and other information potentially relevant to rate analysis or service provider selection.

For example, seasonal patterns may have an affect on a user's approach to heating and/or cooling bills. If a prediction has been set for a particularly severe winter in the user's area, the present invention may provide in-depth approaches and options to save in heating costs.

Analysis engine module 240 may retrieve information from various modules, databases, and/or other sources to determine one or more preferred rate plans and/or service providers based on one or more of prior usage information, user profile information, independent factors, available savings options and other information. Various rate analysis algorithms may be used.

For example, analysis engine module 240 may analyze usage patterns received from prior usage module 100 and compare usage patterns with rate plan information received from billing rate module 160 to determine one or more preferred rate plans available for a particular user. In another embodiment of the present invention, analysis engine module 240 may receive information from profile module 110, external data module 170 and other sources. Information received from profile module 110 and external data module 170 may be retrieved by analysis engine module 240 to determine one or more preferred rate plans available for a particular user. Other combinations and options are available.

In another embodiment, analysis engine module 240 may determine one or more preferred rate plans for a user at predetermined intervals, upon the occurrence of one or more predetermined events, at the request of a user or other triggering event. For example, analysis engine module 240 may determine one or more preferred rate plans for a user at predetermined time intervals (e.g., on a weekly basis) or predetermined events (e.g., when a service provider publishes a revised rate plan).

In another embodiment, analysis engine module 240 may determine one or more hypothetical beneficial rate plans as part of a process of demand aggregation and bidding carried out by the demand aggregation module 220 (as discussed in detail below).

For example, to determine one or more preferred rate plans for a particular user, analysis engine module 240 may calculate the cost of each rate plan in billing rate module 160 using transactional history information stored in prior usage module 100. Information and preferences stored in profile module 110 may then be factored into the determination process. In another embodiment, each of the individual pieces of information and preferences stored in profile module 110 may be assigned different weights (or priorities) in the determination process. For example, a user's service provider preferences may be given more importance than whether a service provider is partnered with the user's airline frequent flier program. Profile module 110 may also provide analysis engine module 240 with information which would allow analysis engine module 240 to determine whether the user potentially qualifies for a government subsidy program or a service provider discount incentive program.

In addition, at some point in the determination of one or more preferred rate plans, analysis engine module 240 may receive information from external data module 170. The information provided by the external data module 170 may be factored into the determination of one or more preferred rate plans. The information may include external data 175 from various sources. For example, external data module 170 may provide analysis engine module 240 with historical quality or reliability performance of one or more service providers. Based upon user quality or reliability preferences stored in profile module 110, one or more service providers may be eliminated from a rate plan determination as not having a sufficient quality or reliability record to satisfy a user's preferences, as specified in profile module 110 or other sources.

The present invention may further provide a rate analysis system and method that may be used to identify (on a per user basis or other basis) the availability of special rates, incentives, discounts, tax credits or other savings based on a predetermined criteria and/or a user's ability or willingness to satisfy the criteria, and other factors. These incentives may be taken into account when performing a rate analysis to determine an advantageous rate plan for one or more users.

Savings information may include static, user-relevant savings information that may include discounts and other applicable savings suggestions. Savings information may also involve proactive savings information that may be accessed via proactive savings module 200. Module 200 may present savings suggestions 205 from various sources that may entail behavior changes, installation and other action from the user. Also, saving calculation module 180 may provide information regarding the amount saved by the user since making the suggested one or more savings suggestions as well as switches to identified rate plans and/or service providers.

Savings module 120 may identify discounts, credits, tax credits, rebates or other savings that may be available to all users or some users based on predetermined criteria, user defined preferences, profile information and/or other information. Thus, the information provided by savings module 120 may be personalized to the user.

For example, some energy companies, municipalities and other entities provide assistance to certain qualifying individuals to insure they are afforded the opportunity to receive certain services. Energy companies, for example, sometimes provide discounts to low income individuals to ensure these families have heat for the winter. In other cases, taking certain steps may qualify a customer for a discount and/or other subsidy. For example, sometimes installing energy efficient equipment (e.g., windows, insulation, or other things) may qualify a user for a discount and savings.

Proactive savings module 200 may provide savings information that may involve a change in a user's behavior or other user action. For example, a user may enter information regarding a cell phone plan where it may be determined that the user exceeds the 200 minute maximum each month by a few minutes. By exceeding the 200 minute limit, the user is elevated to a more expensive bracket. Proactive savings module 200 may suggest to the user that if the user makes an effort to keep track of the minutes used each month and stays below 200 minutes, the user may save money on cell phone usage each month. Thus, it may determined that if the user stays below the 200 minute maximum, the user may save a certain amount each month. This savings information may be conveyed to the user for consideration and/or implementation. Savings suggestions data 205 may be obtained through various sources, service providers, and other entities. Other proactive savings information may include installing a certain type of insulated windows. Depending on the user's location and local winter climate, varying types of windows may be suggested for cost efficient living.

According to another embodiment of the invention the system operator may maintain a database of current savings, as illustrated by savings database 115. The various fields of information that define the criteria by which any discounts, rebates, credits or other savings are applicable may be stored in savings database 115 along with the relevant criteria and information. If a user wishes to learn about the availability of such offers, the user may click on a button that prompts the user to supply certain information relevant to the determination. The process may be interactive and/or iterative. For example, a button may be provided on the web site that enables a user to click for savings information. The user may supply information to the system and the system may make initial determinations of categories, types, or specific savings that may be available based on the information submitted. Rather than seek all of the information that may be necessary to identify all savings available to that individual, certain information may be requested initially. If the information provided results in an identification of offers that may be available to the user, information about the types of savings may be presented to encourage the user to present or supply additional information that can be used to more specifically qualify the user for specific savings.

Savings calculation module 180 may provide information regarding the amount (or percentage) saved by the user since making the suggested one or more changes, switches, and/or other actions as compared to if the user did not make the suggested change, switch or other action. According to an embodiment of the present invention, the savings calculations may be displayed as a time series where the time that the suggestion was implemented may be indicated as the start date, where the differences between what the user would have spent and what the user is spending now since the change may be compared graphically.

The delivery module 130 may address the mode of delivery of information generated by the system. For example, the user may select one or more notification methods, which may include email, phone, cell phone, fax, PDA, pager, link to a webpage and other mode of communication. In addition, the user may specify different modes of delivery for different types of information. For example, for savings information, the user may select an email notification whereas for rate plan information, the user may select phone call notification. Also, a user may specify the frequency of deliver of information, such as savings information. For example, periodic (e.g., weekly, monthly, etc.) updates may be requested.

Text-to-Speech module 140 may facilitate the notification process where a text message may be converted into a voice message that may be left on a user's answering machine informing the user of the availability of relevant information and optionally, what phone number to call to receive the rate plan information. Also, a voice message may inform the user that the requested information may be posted on a website associated with the present invention for the user to view immediately. Other variations and uses exist.

Outbound Calling Module 150 may be used to dial a phone number entered by the user in profile module 110 (or other input area) for notification. Other variations exist.

At a user's option, the system of the present invention may deliver the relevant information to the user, use the information to assist the user in switching to a new service provider or rate plan, and/or automatically switch the user with little or no intervention on the user's part at the time of the switch.

According to another aspect of the invention, the system and method of the invention may comprise a switching module 210 that enables automatic or facilitated switching from one service provider or rate plan to another service provider or rate plan. This automatic or facilitated switching may be among rate plans of different service providers or among different rate plans offered by a single service provider.

In another embodiment of the present invention, the results of the analysis completed by analysis engine module 240 may be provided to switching module 210. Depending upon the user preferences which may be stored in profile module 110 and other factors, various actions may be taken by the switching module 210 in response to the information provided by analysis engine module 240.

For example, if a user's current service provider and rate plan are determined to be beneficial plan for the user, switching module 210 may take no further action. Switching module 210 may inform the user that an analysis was performed by analysis engine module 240 and that the user's current rate plan was found to be an advantageous option.

If analysis engine module 240 determines that a better rate plan is available to a user, switching module 240 may take various actions based upon the user notification, switching preferences and other information stored in the profile module 110 and obtained through other sources. In an embodiment of the present invention, switching module 210 may notify the user that a better rate plan is available to the user. In another embodiment of the invention, switching module 210 may notify the user that a better rate plan is available to the user and may identify the better rate plan to the user. In another embodiment, switching module 210 may notify the user that a better rate plan is available, identify the better rate plan to the user and query the user whether the present invention should switch the user to the better rate plan. In another embodiment, if a user has stored a preference to be automatically switched to a preferred rate plan in the profile module 110, switching module 210 may switch the user to the identified preferred rate plan. Switching module 210 may use whatever technology known in the art to allow the user to authorize switching module 210 to make a switch directly with the service provider on behalf of the user. This technology may include a digital signature stored in the switching module 210. Optionally, switching module 210 may inform the user that the switch to an identified preferred rate plan has occurred. Other switching options exist.

Switching module 210 may notify or inform the user using any sufficient or appropriate method or medium known in the art. Non-limiting examples of sufficient or appropriate methods or mediums include electronic mail, printed notification, audible message via telephone, electronic presentment, pager, and other modes of communication.

If analysis engine module 240 has determined, based upon the information provided by profile module 110 and/or other information, that a user potentially qualifies for a government subsidy or a service provider incentive discount program, switching module 210 may notify the user of the potential qualification. In a further embodiment, switching module 210 may notify the user of the potential qualification and inform the user of the potential savings provided by the government subsidy, service provider incentive discount program or other program.

A rate plan analysis system of the present invention may further analyze at least one or more of user usage and rate plan information across more than one service to identify if a user could benefit from bundling two or more services from a single provider or several partnered providers to lower overall cost.

In another embodiment of the present invention, demand aggregation module 220 may analyze current and projected usage data and user preferences (including thresholds of savings beyond which a user would switch providers), aggregate user demand based on such data and preferences, and bid such user demand to service providers.

The present invention enables a group of users to be aggregated and switched in bulk to a service provider and/or rate plan and to enable discounted or custom rate plans to be created by service providers, or to enable the group to specify parameters which, if satisfied, would cause the group to switch to a service provider or plan that satisfied the parameters.

The system may leverage its large user base and the intelligence built into the analysis engine in several ways, e.g., to aggregate demand and enable users to drive rate plans. By way of example, the system operator may periodically query users to determine the parameters that would cause them to add a new service, switch to a new service provider or service plan or make other changes, and provide aggregate data to service providers to enable them to acquire a large group of customers at once. So rather than a service provider announcing a discounted rate plan and seeing how many people sign up, the service provider will know in advance that if it offers a certain rate plan it will have a certain number of customers. As another example, the system may enable service providers the ability to query customers to determine the demand that would exist for a service based on certain parameters (e.g., a new price plan or other factors). For example, the system may deliver queries to users on behalf of service providers to enable a service provider to gain insight into the effectiveness of a rate plan before the service provider implements the plan.

In another embodiment of the present invention, various data sets from all or any combination of prior usage module 100, billing rate database 160, profile module 110, external data module 170, and hypothetical and other analyses performed by analysis engine module 240 may be processed by demand aggregation module 220. Other information may also be used.

Demand aggregation module 220 may determine price levels at which various quantities of users would, or would be expected to, switch providers or commit to purchase given levels of services in excess of existing levels. For example, demand aggregation module 220 may determine that 200,000 long distance users would switch to a new long distance telephone provider if that provider would reduce its weekday per minute charge to 4 cents. In another example, demand aggregation module 220 may determine that 200,000 users would commit to purchase 50 minutes of overseas long distance minutes per month to a particular foreign country at a price of $15.00, regardless of whether they actually use the full 50 minutes. Any of these parameters can be varied. In another embodiment of the present invention, demand aggregation module 220 may generate price proposals, with or without purchase quantity commitments.

In another embodiment of the present invention, demand aggregation module 220 may present such proposals to providers, either automatically, on a schedule, upon demand of the operator of the invention, or based on other triggering event(s) or predetermined time period(s). Demand aggregation module 220 may utilize any suitable means or technology known to the art to communicate the proposals to providers, including electronic transmission, and to receive the acceptance of such proposals. Accepted proposals may be forwarded to billing rate database 160.

Figure 2:
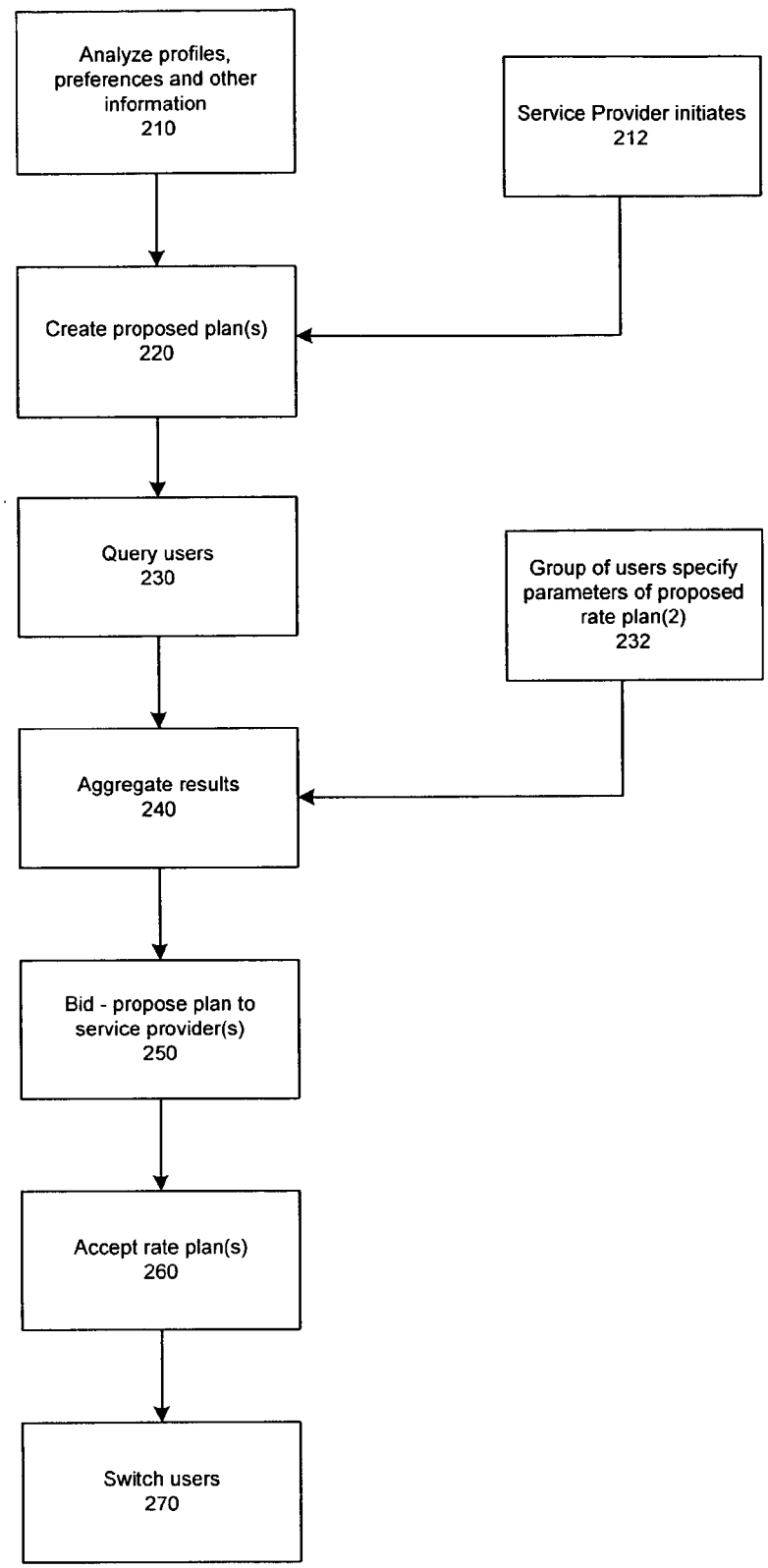
FIG. 2 is a flowchart of a demand aggregation process, in accordance with the present invention.

FIG. 2 is a flowchart illustrating an example of a demand aggregation process, according to an embodiment of the present invention. The process may be driven by various entities, such as the present system, a service provider, one or more users or other entities. At step 210, the service may analyze various user information, such as user profile information, user preferences, previous switching history and other relevant information. At step 220, the system may create a proposed plan that may be favorably received by all or selected users. For example, a proposed plan may include 100 long distance minutes for 5 cents a minute. In addition, the system may generate a series of proposed plans where users may indicate which plans are of interest to them. At step 230, the system may query current users to ascertain which users would be willing to participate in the one or more proposed plans. In addition, the system may get users to commit to the proposed plan. At step 240, the system may aggregate the results of the query. The proposed plan may be submitted to one or more service providers for bidding which may involve proposing the plan to the service provider and presenting the number of users willing to commit to the plan. Other information may also be provided. If a service provider agrees to the proposed plan, the system may then accept the agreed to one or more rate plans, at step 260. Also, different rate plans may be offered to different categories of users. Depending on the switching preference identified by the users, the system may switch the users to the proposed plan, at step 270.

There may be instances where a service provider proposes a special rate and uses the system of the present invention to query users. According to this embodiment, a service provider 212 may initiate the demand aggregation process by creating a proposed plan, at step 220 and proceeding with the subsequent steps, as discussed above.

There may also be circumstances where one or more users may specify parameters that are of interest to them regarding existing or new rate plans, at step 232. The system may aggregate the users and results at step 240 and proceed with the subsequent steps of the demand aggregation process, as discussed above.

Service providers may offer affinity programs based on use of their service. For example, affinity programs may reward users with various incentives for new subscribers or continued and extensive patronage. For example, affinity programs may reward users with frequent flyer miles, cash back, store credit and other incentives. A user's association with various affinity programs may be a factor in selecting a service provider. If a user has a long history with a particular affinity program or is interested in receiving/qualifying for incentives and benefits, the user may place greater weight (or importance) with this factor in determining a preferred service provider. Affinity data 235 from various sources may be used to make preferred service provider and other determinations.

Furthermore, some service providers offer flexible payment options, such as annualized payment plans with equal monthly payments for certain services to minimize the financial uncertainty of varying bills due to seasonality and other factors. For example, some energy companies enable a customer to pay a fixed monthly fee based on estimated annual usage rather than facing the uncertainty of the potential ups and downs of energy bills during periods of peak and lesser demand. Other flexible payment options may be offered. Flexible payment options may be a factor in considering one or more preferred rate plans and/or service providers for a user.

Figure 3:
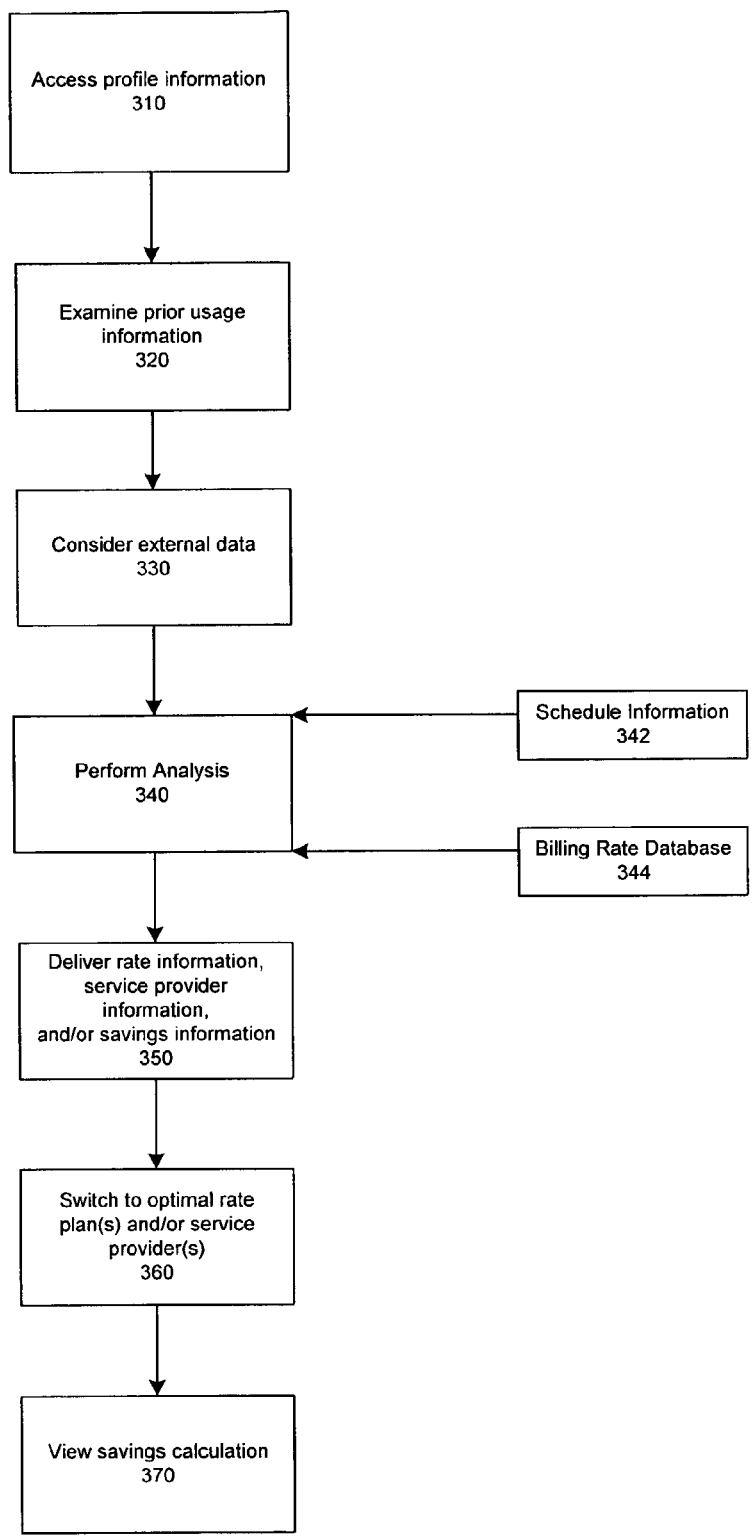
FIG. 3 is a flowchart of an analysis process, in accordance with the present invention.

FIG. 3 is a flowchart of the analysis process, according to an embodiment of the present invention. The system of the present invention may access user profile information from profile module 110, which may include user demographic information, preferences and other personal information, at step 310. The system may also examine prior usage information, at step 320. Prior usage information may be retrieved from prior usage module 100 which may be used to determine usage patterns, trends and other useful information. At step 330, the system may consider external data from external data module 170 which may include user independent factors that may affect the rate and/or service provider analysis.

At step 340, the system may analyze the information gathered to determine one or more of preferred rate plans, preferred service providers, savings information and other information. The analysis may be performed according to a predetermined schedule as retrieved from schedule information 342. Also, billing rate database 344 may supply various rates and other information as supplied by service providers and other entities. The system may then deliver the requested information to the user, at step 350, in accordance to one or more predetermined deliver methods as identified by the user. Depending on the user's preference, the system may switch the user to the preferred rate plan(s) and/or service provider(s). The switching may be performed automatically or partially automatically, as indicated by the user. At step 370, the user may view the user's savings in a graphical format based on the recommended switch(es) at savings calculation module 180.

The invention provides potential economic benefit and advantages to the system operator in a variety of ways. One way, for example, is through, consumer subscriptions. For example, the system operator may permit users to access the web site for free to manually enter data and search for better deals to realize the value of the system. However, the system operator may charge a subscription fee (e.g., monthly) for users who want the web site to automatically monitor rate plans for them and alert them to better deals and/or automatically switch them, if desired. Alternatively, the system operator may prompt a user when a better rate plan becomes available, and notify the user of how much savings can be realized by switching to the plan, but not identify the plan unless the user agrees to pay a fee for receiving additional information about the plan. According to this embodiment, the system operator can collect a flat fee each the system identifies a better plan and the user requests information about the plan, a fee based on a percentage of the first month's savings for a newly identified plan or other compensation.

If the system operator charges a subscription fee or other user fees, it may take advantage of a viral marketing effect by offering users subscribers a free month subscription for each 2 (or other number) new paying subscribers they bring to the system operator. Other incentives can be offered.

Another benefit to the system operator may result from collecting fees from service providers. For example, the system operator may collect fees from service providers based on either: 1) a per switch fee for each customer delivered to the service provider; 2) a flat fee (e.g., monthly or annual) for the service provider to be included in the database of providers that are searched; and other fees or compensation.

Another benefit to the system operator is potential licensing arrangements. For example, the system operator can license one or more modules of the rate analysis engine to individual service providers or other web sites that want to offer this tool as a feature to their existing customers.

Another benefit to the system operator is potential advertising revenue. For example, the service providers may advertise on the web site or to maintain an appearance of impartiality the system operator may not accept advertising from service providers in its database. It may, however, accept advertising from related sources (e.g., telephone handset manufacturers when a customer is looking at cellular rate plans, etc.).

Although the invention has been described in terms of particularly preferred embodiments, it is not limited to these embodiments. Alternative embodiments and modifications which would still be encompassed by the invention may be made by those skilled in the art, particularly in light of the foregoing teachings. Therefore, the following claims are intended to cover any alternative embodiments, modifications or equivalents which may be within the spirit and scope of the invention as defined by the claims.

The invention claimed is:

1. A computer implemented multi-factor rate analysis system for analyzing service provider rate plan information, the system comprising:
    a user module for accessing user information including a user's prior usage information and the user's preferences;
    a service provider database for storing service provider information wherein service provider information comprises rate plan information associated with one or more service providers;
    a multi-factor rate analysis engine module for analyzing on a per user basis user information and service provider information to generate one or more savings suggestions based on the rate plan information, the user's prior usage information and at least one user preference; and
    wherein the user information further includes a threshold amount of savings that would cause the user to switch rate plans.

2. The system of claim 1 wherein the user's prior usage information includes information regarding a user's usage patterns for a service over two or more periods of time.

3. The system of claim 1 wherein prior usage information comprises prior usage information that is electronically extracted from an electronic bill payment system to avoid the need for a user to manually enter at least some prior usage information.

4. The system of claim 1 further comprising a savings module for providing personalized savings information to a user wherein the personalized savings information is generated by the analysis engine module based on the user's prior usage data and at least one of the user's preferences.

5. The system of claim 4 wherein savings information comprises incentives or discounts available to the user based on equipment owned by the user.

6. The system of claim 4 wherein savings information comprises proactive savings information including user behavior change recommendation information.

7. The system of claim 1 further comprising an external data module for storing user independent data wherein the analysis engine module further analyses user independent data in generating one or more savings suggestions.

8. The system of claim 1 further comprising a switching module for facilitating the ability for the user to switch to a new rate plan.

9. The system of claim 1 further comprising a demand aggregation module for aggregating one or more users who are willing to transfer to an identified service provider.

10. The system of claim 1 further comprising a demand aggregation module for aggregating one or more users who are willing to transfer to an identified rate plan.

11. The system of claim 1 further comprising means for automatically monitoring rate plans for a subscriber user and a delivery module for delivering alerts to a subscriber user when a better rate is available to the subscriber user.

12. A computer implemented multi-factor rate analysis system for analyzing service provider rate plan information, the system comprising:
   a user module for accessing user information including a user's prior usage information and the user's preferences;
   a service provider database for storing service provider information wherein service provider information comprises rate plan information associated with one or more service providers;
   a multi-factor rate analysis engine module for analyzing on a per user basis user information and service provider information to generate one or more savings suggestions based on the rate plan information, the user's prior usage information and at least one user preference;
   the user information further including rate plan switching criteria and further comprising a switching module for automatically switching the user to a new rate plan when the rate plan switching criteria is met.

13. A computer implemented method for analyzing service provider rate plan formation, the method comprising the steps of:
   accessing user information including a user's prior usage information and the user's preferences;
   storing service provider information wherein service provider information comprises rate plan information associated with one or more service providers;
   analyzing, on a per user basis, user information and service provider information to generate one or more preferred savings suggestions based on the rate plan information, the user's prior usage information and at least one of the user's preferences; and
   wherein user information further includes a threshold amount of savings that would cause the user to switch rate plans.

14. The method of claim 13 wherein the user's prior usage information includes information regarding a user's usage patterns for a service over two or more periods of time.

15. The method of claim 13 wherein the prior usage information comprises prior usage information that is electronically extracted from an electronic bill payment system to avoid the need for a user to manually enter at least some prior usage information.

16. The method of claim 13 further comprising the step of providing personalized savings information to a user wherein the personalized savings information is generated based on the user's prior usage information and at least one of the user's preferences.

17. The method of claim 16 wherein savings information comprises incentives or discounts available to the user based on equipment owned by the user.

18. The method of claim 16 wherein savings information comprises proactive savings information including user behavior change recommendation information.

19. The method of claim 13 further comprising the step of storing user independent data and wherein analyzing user information and service provider information comprises the step of analyzing the user independent data to generate one or more savings suggestions.

20. The method of claim 13 further comprising the step of facilitating the ability for the user to switch to a new rate plan.

21. The method of claim 13 further comprising the step of aggregating one or more users who are willing to transfer to an identified service provider.

22. The method of claim 13 further comprising the step of aggregating one or more users who are willing to transfer to an identified rate plan.

23. The method of claim 13 further comprising the step of enabling the user to specify one or more modes of delivery.

24. A computer implemented method for analyzing service provider rate plan formation, the method comprising the steps of:
   accessing user information including a user's prior usage information and the user's preferences;
   storing service provider information wherein service provider information comprises rate plan information associated with one or more service providers;
   analyzing, on a per user basis, user information and service provider information to generate one or more preferred savings suggestions based on the rate plan information, the user's prior usage information and at least one of the user's preferences; and
   wherein the user information further includes rate plan switching criteria, and further comprising the step of automatically switching the user to a new rate plan when the rate plan switching criteria is met.

* * * * *